US006458724B1

(12) United States Patent
Veiga et al.

(10) Patent No.: US 6,458,724 B1
(45) Date of Patent: *Oct. 1, 2002

(54) COATED MULTI-LAYERED WOVEN TEXTILE FABRICS FOR USE IN AIR-HOLDING VEHICLE RESTRAINT SYSTEM

(75) Inventors: Manuel J. Veiga, Tewksbury; Richard J. Satin, Swampscott, both of MA (US)

(73) Assignee: Bradford Industries, Inc., Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,628

(22) Filed: Jan. 28, 2000

Related U.S. Application Data

(63) Continuation-in-part of application No. 09/327,243, filed on Jun. 7, 1999, now Pat. No. 6,239,046, and a continuation-in-part of application No. 09/327,244, filed on Jun. 7, 1999, now abandoned.

(51) Int. Cl.$^7$ ............................ D01F 6/00; B60R 21/20
(52) U.S. Cl. ........................ 442/76; 442/67; 442/71; 442/149; 442/157; 442/164; 442/172; 442/218; 280/728.1; 280/729; 280/733; 428/12; 428/33; 428/34.1; 428/34.3; 428/34.5; 428/34.6; 428/34.7; 428/35.2; 428/36.1; 428/36.2; 428/57; 428/58; 428/192
(58) Field of Search ........................ 428/12, 33, 34.1, 428/34.3, 34.5, 34.6, 34.7, 35.2, 36.1, 36.2, 57, 58, 192; 442/67, 71, 76, 149, 157, 164, 172, 218; 280/728.1, 729, 733

(56) References Cited

U.S. PATENT DOCUMENTS

| | | |
|---|---|---|
| 4,284,682 A | 8/1981 | Tschirch et al. |
| 5,110,666 A | 5/1992 | Menzel et al. |
| 5,178,938 A | 1/1993 | Magistro et al. |
| 5,226,671 A | 7/1993 | Hill |
| 5,240,765 A | 8/1993 | Takahashi et al. |
| 5,254,621 A | 10/1993 | Inoue et al. |
| 5,258,211 A | 11/1993 | Momii et al. |
| 5,298,317 A | 3/1994 | Takahashi et al. |
| 5,399,402 A | 3/1995 | Inoue et al. |
| 5,514,431 A | 5/1996 | Shimomura |
| 5,630,620 A | 5/1997 | Hirai et al. |
| 5,632,057 A | 5/1997 | Lyden |
| 5,647,079 A | 7/1997 | Hakamiun et al. |
| 5,651,395 A | 7/1997 | Graham et al. |
| 5,704,402 A | 1/1998 | Bowen et al. |
| 5,707,711 A | 1/1998 | Kitamura |
| 5,721,046 A | 2/1998 | Shrewsburg |
| 5,863,644 A | 1/1999 | Bonigk et al. |
| 5,881,776 A | 3/1999 | Beasley, Jr. |
| 5,921,287 A | 7/1999 | Bowen et al. |
| 6,037,279 A * | 3/2000 | Brookman et al. ............ 442/71 |
| 6,149,194 A * | 11/2000 | Breed et al. ............. 280/743.1 |
| 6,169,043 B1 * | 1/2001 | Li ................................ 442/71 |
| 6,177,365 B1 * | 1/2001 | Li ................................ 442/71 |
| 6,177,366 B1 * | 1/2001 | Li ................................ 442/71 |
| 6,200,915 B1 * | 3/2001 | Adams et al. ............... 442/157 |
| 6,220,309 B1 * | 4/2001 | Sollars, Jr. .................. 139/389 |
| 6,239,046 B1 * | 5/2001 | Veiga et al. .................. 442/76 |
| 6,250,668 B1 * | 6/2001 | Breed et al. ............. 280/730.2 |
| 2001/0005660 A1 * | 6/2001 | Li et al. ........................ 442/71 |
| 2001/0009829 A1 * | 7/2001 | Sollars, Jr. et al. ........... 442/76 |

* cited by examiner

*Primary Examiner*—Terrel Morris
*Assistant Examiner*—Arti Singh
(74) *Attorney, Agent, or Firm*—Hollander Law Firm, P.L.C.

(57) ABSTRACT

The invention is directed to multi-layered textile fabrics having a plurality of polymeric coating layers of polyurethane and/or polysiloxane coated thereon. The coating layers are applied to such multi-layered woven textile fabric substrates having preconfigured air-holding cavities therein to form an improved air-holding vehicle restraint system, such as an air bag or side air curtain with superior air-holding characteristics. In certain instances, the multi-layered textile fabrics are coated on one side only, and in others they may be coated on both sides, i.e., opposed first and second surfaces. The layers of the multi-layered fabric can then be joined by means of heat sealing, RF welding or combinations thereof, for purposes of forming an air bag or side air curtain without the need for sewing or stitching. The coated fabrics facilitate manufacture of air bags, side curtains or the like with both reduced cutting and sealing steps than fabrics of the prior art.

27 Claims, 4 Drawing Sheets

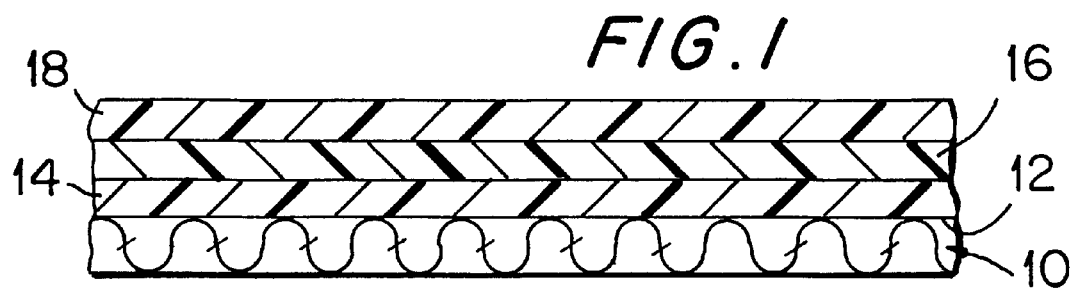
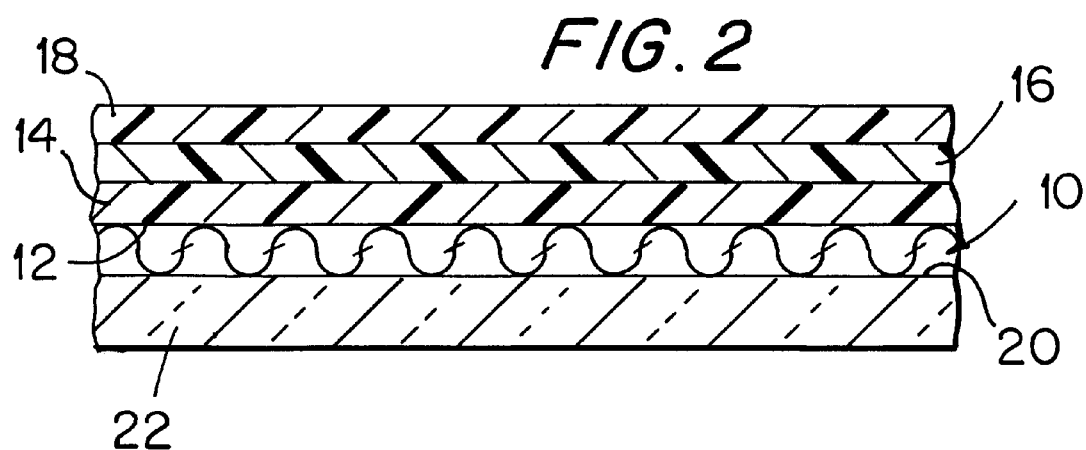

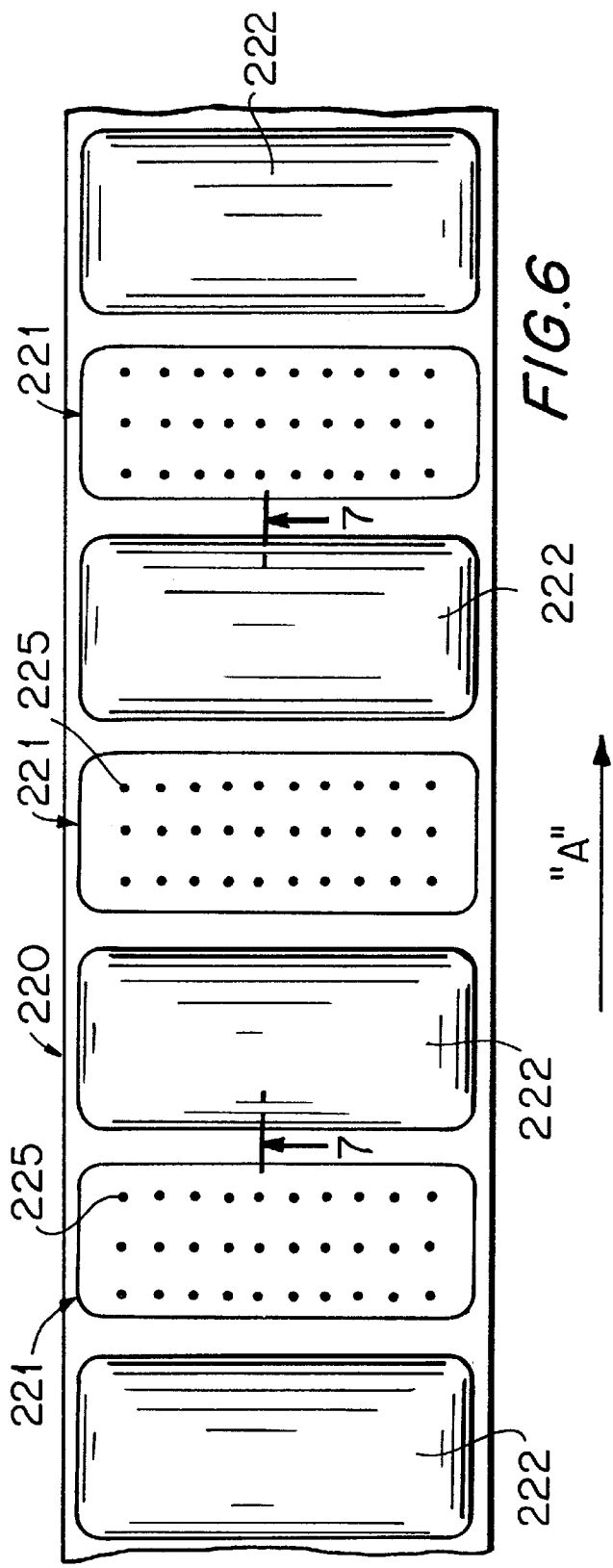
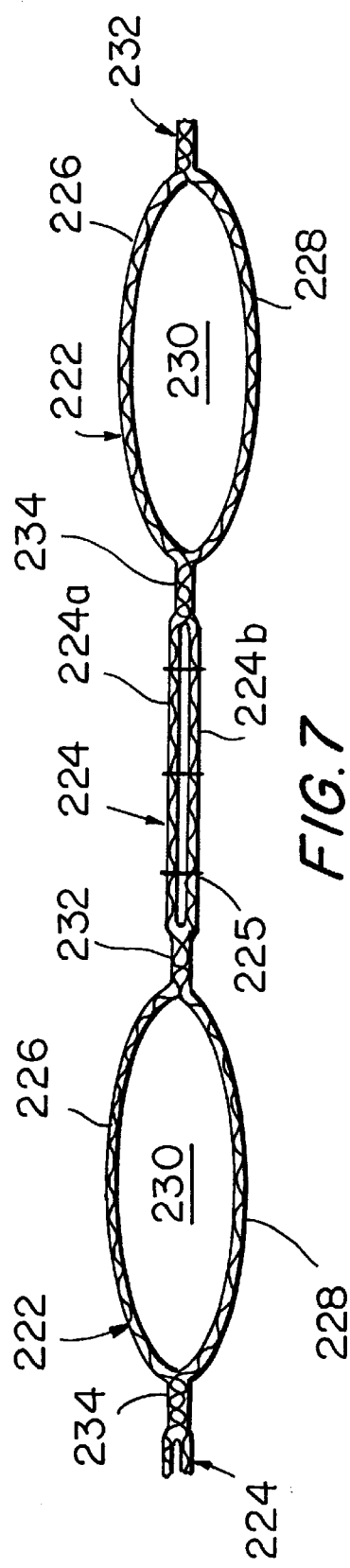

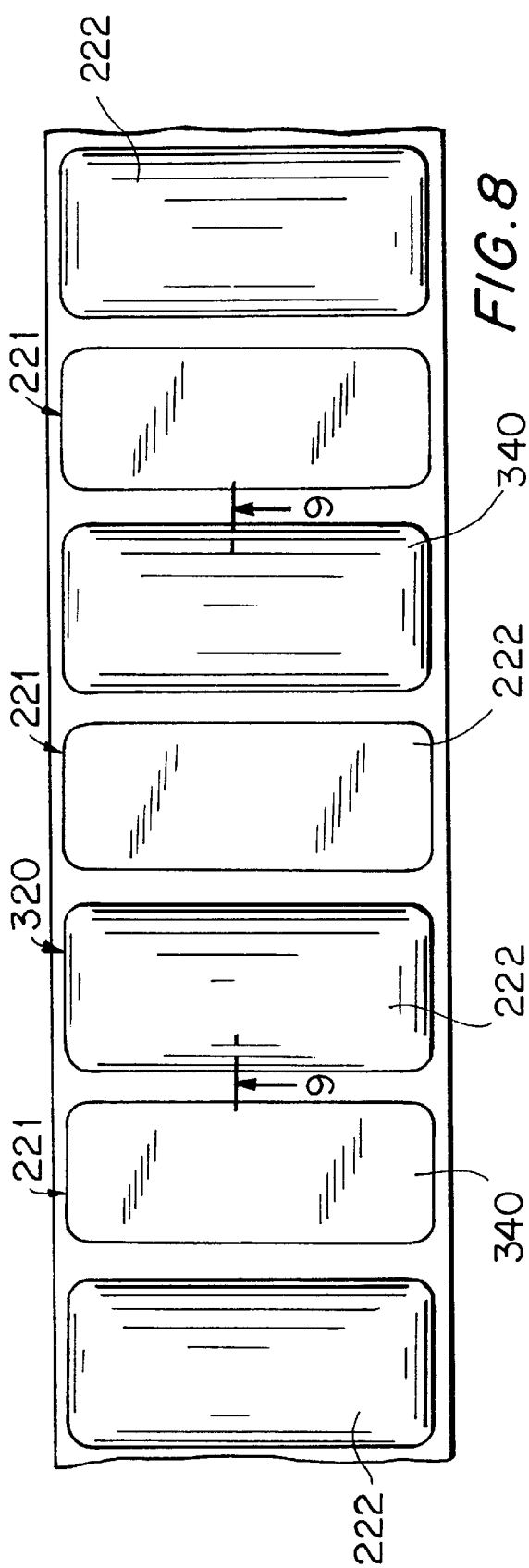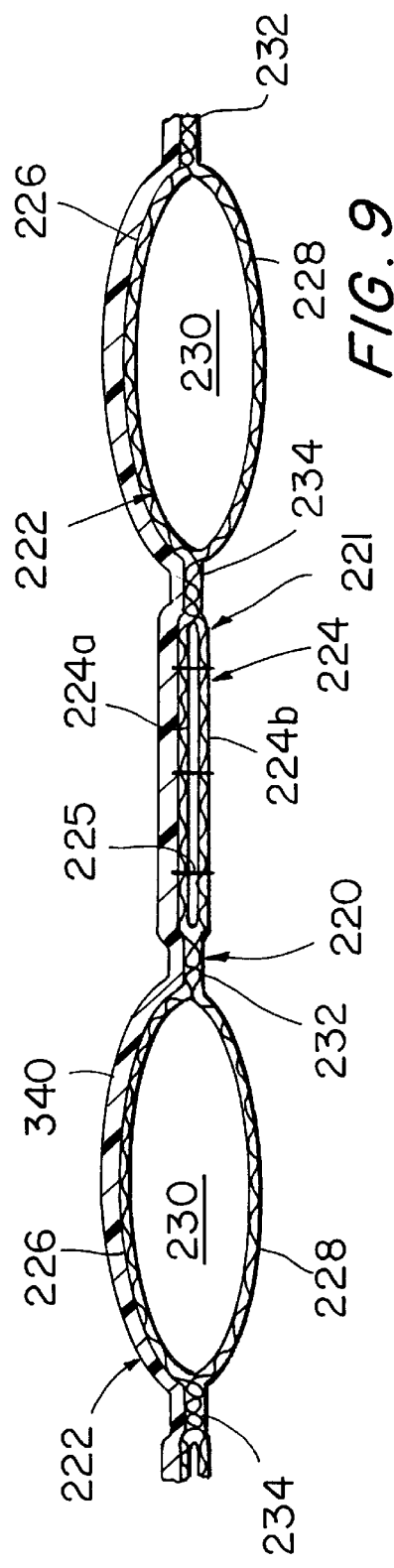

COATED MULTI-LAYERED WOVEN TEXTILE FABRICS FOR USE IN AIR-HOLDING VEHICLE RESTRAINT SYSTEM

CROSS-REFERENCE TO RELATED APPLICATIONS

This application is a continuation-in-part of U.S. application Ser. No. 09/327,243, filed Jun. 7, 1999, now U.S. Pat. No. 6,239,046, and Ser. No. 09/327,244 filed Jun. 7, 1999. now abandoned in favor of continuation application Ser. No. 09/956,639, filed Sep. 19, 2001.

BACKGROUND OF THE INVENTION

1. Field of the Invention

This invention relates to coated woven textile fabrics for use in an air-holding vehicle occupant restraint system and, more particularly, to a multi-layered woven fabric having preconfigured air-holding cavities and a plurality of polymeric layers coated thereon.

2. Description of the Related Art

Presently known restraint systems for vehicles include driver and passenger side air bags which are housed in the steering wheel and in the dashboard, respectively, in a collapsed, folded condition and are adapted to be deployed instantaneously by introduction of a gas—sometimes referred to herein as "air"—upon the occurrence of a collision. The automotive industry has recently introduced air bags which are housed in the rear supports of the front seats or in the rear seats to protect the cabin occupants in the event of a collision occurring on either side of the vehicle. More recently, a further safety feature that has been made available for passenger vehicles, especially the so-called sport utility vehicles (SUV), are air-holding side impact protective inflatable side curtains which are designed to provide a cushioning effect in the event of rollover accidents. These side curtains are housed uninflated in the roof of the vehicle or in one of the main support pillars of the vehicle and deploy along the interior sidewalls of the cabin of the SUV in the event of a rollover.

One technique for improving the efficacy of air-holding capability in vehicle restraint systems has addressed the coatings to be applied to the textile substrate to improve air retention. In the prior art, coated air bags were made by coating a nylon substrate with silicone rubber and chloroprene. These coated air bags, however, were not susceptible to heat sealing. In order to ameliorate some of the problems inherent in chloroprene and silicone rubber coatings, it has been disclosed in the art, for example, in Menzel et al., U.S. Pat. No. 5,110,666, to coat a woven nylon substrate with polyurethane to provide the desired permeability to better retain the inflation gas. Certain aqueous silicone emulsion coating compositions that yield a tack-free surface and high mechanical strength to prevent cracking on inflation of the air bag have also been disclosed in the art, such as is disclosed, for example, in Inoue et al., U.S. Pat. No. 5,254,621.

Despite the advances in air bag coating technology, the problems of controlling air permeability, air pressure, and volume still remain. For example, one particular cause of air loss arises out of the fact that during the manufacture of the air bags, they are often stitched together by conventional sewing procedures which utilize sewing threads. Each stitch inherently creates a potential gas leak that adversely affects the integrity and, hence, the air holding capability of the bag, especially when instantaneous deployment of an operative air bag is required. Moreover, such vehicle occupant restraint systems often require great amounts of cutting, stitching and sealing in their production. I have invented a coated flexible multi-layered textile fabric for air-holding vehicle devices which can be heat sealed to withstand inflation pressures in such inflatable restraint systems in a controlled and improved manner, while minimizing the amount of cutting and sealing actually required.

BRIEF SUMMARY OF THE INVENTION

It has been found that by applying a plurality of polymeric polyurethane and/or polysiloxane coating layers to a woven textile fabric substrate having preconfigured air-holding cavities, an air-holding vehicle restraint system is obtained that has superior air holding characteristics, viz., permeability, volume and pressure retention. Further, if a multi-layered woven textile fabric substrate having top and a bottom surfaces is first coated on both surfaces with an adhesive polyurethane layer and, thereafter, the adhesive polyurethane layer is coated with a layer of an elastomeric polyurethane or an elastomeric polysiloxane, the air bag formed therefrom has superior air holding permeability and volume, and, in the case of polysiloxane, also possesses superior heat resistance. Since silicone is inert, it will not block or stick to itself while housed in the vehicle, even during extended periods of non-use, but will nonetheless deploy in an efficient and rapid manner when the need arises to provide the required protection in the event of a collision.

The invention relates to a coated textile substrate for an air-holding vehicle restraint system, which comprises a multi-layered textile substrate having opposed outer surfaces, a first coating layer of an adhesive polyurethane on a first surface of the multi-layered textile substrate, and at least a second coating layer of an elastomeric polysiloxane on the first coating layer. In one preferred embodiment, the invention relates to a coated textile fabric for an air-holding vehicle restraint system, which comprises, a multi-layered textile substrate having first and second opposed outer surfaces and preconfigured air-holding cavities therein, at least a first coating layer of adhesive polyurethane coated on both the first and second opposed outer surfaces of the textile substrate, and at least a second coating layer of a polymeric material coated on both of the first coating layers of adhesive polyurethane.

The multi-layered textile substrate is preferably a fabric constructed from synthetic material, preferably selected from the group consisting of polyamides and polyesters. In the preferred embodiment, the coated textile substrate is a woven nylon fabric, and the first coating layer is selected from the group consisting of aromatic or aliphatic polyester and polyether polyurethanes. The second coating layers are each coated with a third coating layer of elastomeric polyurethane or polysiloxane. Preferably, one of the first coating layers is coated with a second coating layer of elastomeric polyurethane and the other first coating layer is coated with a second coating layer of polysiloxane.

In a preferred embodiment, a coated textile fabric for an air-holding vehicle restraint system is disclosed, which comprise, a multi-layered woven fabric substrate having first and second opposed outer surfaces and preconfigured air-holding woven cavities defined between the fabric layers, at least a first coating layer of adhesive polyurethane coated on both the first and second outer surfaces of the textile substrate, at least a second coating layer of elastomeric polyurethane or polysiloxane coated on the first coating layers of adhesive polyurethane, and at least a third coating layer of a polymeric material coated on at least one of the second coating layers.

The coated woven textile substrate is preferably a fabric constructed from synthetic material, wherein the synthetic material is a synthetic filamentary material selected from the group consisting of polyamides and polyesters. Also, the woven textile substrate is preferably comprised of woven nylon filaments. The first coating layers are preferably selected from the group consisting of aromatic or aliphatic polyester or polyether polyurethanes. The first coating layers are preferably coated with a second coating layer of elastomeric polyurethane.

One of the first coating layers may be coated with a second coating layer of elastomeric polyurethane and one of the other first coating layers is coated with a second coating layer of polysiloxane. The second coating layer of elastomeric polyurethane may be coated with a third coating layer of elastomeric polyurethane, and the second coating layer of polysiloxane may be coated with a third coating layer of polysiloxane. The second coating layer of elastomeric polyurethane is preferably coated with a coating layer of elastomeric polyurethane, and the second coating layer of polysiloxane is preferably coated with a third coating layer of polysiloxane. The second coating layer of polyurethane is preferably coated with a third coating layer of elastomeric polyurethane and the second coating layer of polysiloxane is preferably coated with a third coating layer of polysiloxane.

Preferably, the first coating layers of adhesive polyurethane each have a coating weight of from about 0.3 ounces/sq. yd to about 1.5 ounces/sq. yd. Further, the coating weight is preferably about 0.5 ounces/sq. yd. The second coating layer is preferably an elastomeric aliphatic or aromatic polyether or polyester polyurethane having a solids content of from about 30% to about 100% by weight and preferably weighs about 1 ounce/sq. yd. to about 8 ounces/sq. yd, and preferably about 2 ounces/sq. yd. The third coating layer is preferably an elastomeric aromatic or aliphatic polyether or polyester polyurethane having a coating weight of from about 0.2 ounces/sq. yd. to about 2.0 ounces/sq. yd.

A method of coating a textile substrate for an air-holding vehicle restraint system is disclosed, which comprises, coating an adhesive polyurethane to a first surface of a multi-layered textile substrate having opposed surfaces and drying at an elevated temperature to form a first coating layer, coating an elastomeric polyurethane to said adhesive polyurethane coating layer and drying at an elevated temperature to form a second coating layer, and coating a polyether or polyester polyurethane to the second polyurethane coating layer and drying at an elevated temperature to form a third coating layer. The multi-layered textile substrate is a fabric constructed from synthetic fibers selected from the group consisting of polyamides and polyesters. The multi-layered textile substrate is a woven multi-layered fabric having opposed layers forming preconfigured pockets having air-holding cavities, the pockets being connected by fabric web connectors formed at least in part of fabric portions of dual thickness and fabric portions of opposed fabric layers stitched together at predetermined locations. The multi-layered textile substrate is preferably woven from nylon filaments.

A method of forming an air-holding restraint system for a vehicle is also disclosed, which comprises, coating an adhesive polyurethane to a first surface of a multi-layered textile substrate to form a first coating layer, coating an elastomeric polyurethane to the first coating layer to form a second coating layer, coating a top-coating of a polyester or polyether polyurethane to form a third coating layer, repeating steps (a), (b), and (c) on a second surface of the multi-layered textile substrate, and sealing the first and second coated textile substrates together by radio frequency sealing, hot air sealing or ultrasonic sealing.

A preferred method of forming an air-holding restraint system for a vehicle is also disclosed, which comprises, coating an adhesive polyurethane to a first surface of a multi-layered textile substrate to form a first coating layer, coating an elastomeric polysiloxane to the first coating layer to form a second coating layer, repeating coating steps a) and b) on a second surface of the multi-layered textile substrate, and sealing the coated textile layers together by radio frequency sealing, hot air sealing or ultrasonic heat sealing.

BRIEF DESCRIPTION OF THE DRAWINGS

FIG. 1 is a cross-sectional view of a single layer textile substrate having a plurality of polyurethane coating layers on one surface;

FIG. 2 is a cross-sectional view of a single layer textile substrate having a plurality of polyurethane coating layers on one surface as illustrated in FIG. 1, and a polysiloxane coating on the opposite or reverse surface;

FIG. 6 is a top plan view of a continuous web of a multi-layered fabric having air-holding pockets defined between the multi-layers of fabric connectors;

FIG. 7 is a cross-sectional view taken along lines 6—6 of FIG. 6, showing the multi-layered fabric web of FIG. 6 defining the air-holding pockets;

FIG. 8 is a top plan view of the continuous web of a multi-layered fabric of FIG. 6, coated in accordance with the present invention; and FIG. 9 is a cross-sectional view taken along lines 9—9 of FIG. 8, showing the coated fabric of FIG. 8 defining coated multi-layered air-holding pockets.

DETAILED DESCRIPTION OF THE PREFERRED EMBODIMENTS

Figure 3:
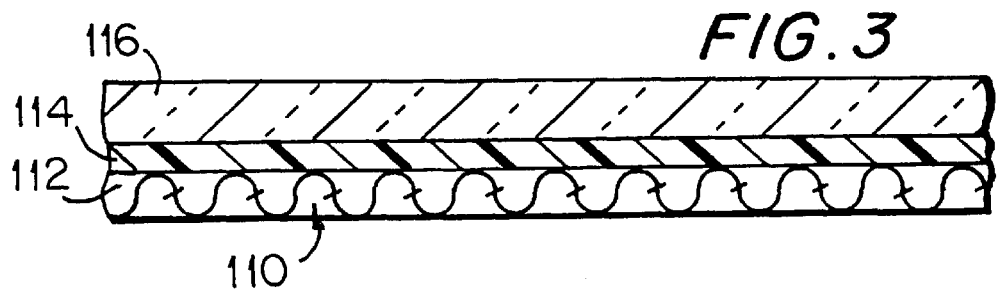
FIG. 3 is a cross-sectional view of a single layer textile substrate coated on one surface with a polysiloxane and a polyurethane layer.

It has been found that when multi-layered woven textile fabric substrates having preconfigured air-holding cavities therein are coated with multiple layers of polymeric coatings, including polyurethane and/or polysiloxane, such coated substrates can be used to produce air-holding vehicle safety restraint systems having improved air retention, permeability and volume properties. Such coated fabric substrates have the additional ability to be joined by means other than, or in addition to, sewing, including such means as heat sealing, radio frequency (RF) welding, and vulcanization. It has also been found that when such textile substrates are coated with a polyurethane layer and, thereafter, with a layer of polysiloxane, and converted into an air bag or other vehicle restraint device such as a side air curtain, the polysiloxane coating permits the air bag to better withstand the extremely high temperatures encountered during inflation and prevents blocking or sticking of the coatings to each other, a condition that otherwise makes deployment of an operative air bag difficult or impossible to achieve. Examples of such coated fabrics and the methods of coating such fabrics are disclosed in commonly assigned copending parent U.S. application Ser. Nos. 09/327,243 and 09/327,244, filed Jun. 7, 1999, the disclosures of which are incorporated herein by reference and made a part of this disclosure. In such restraint systems, it has been found that the use of a multi-layered textile fabric substrate which includes layers which are already partially attached, reduces the need for excessive cutting and attaching, thus reducing the possibility of air loss upon deployment.

Either natural or synthetic fibers can be employed to form textile fabric substrate contemplated herein, with polyamide or polyester filaments or fibers being preferred. Such fibers can be in the form of either a woven, knit, or non-woven fabric. Woven multi-layered textiles having preconfigured air-holding cavities, such as those that can be produced on a Jacquard machine or a Dobby loom, particularly are contemplated herein as textile fabric substrates that can be coated in accordance with the present invention. The preconfigured air-holding cavities can be of any size or shape such as, for example, pockets, tubular channels and the like. Woven nylon is the specific textile fabric substrate which is preferred. Any denier size, shape and weaving configuration can be employed to advantage. Generally, the shape or configuration to be employed in the air-holding restraint system will depend upon its ultimate location in the vehicle. For example, driver or passenger air bags will generally be elliptical, spherical or circular in shape, while side air curtains will generally be rectangular or oval in configuration.

The coating of the fabric substrate with the desired layers of polyurethane and/or polysiloxane takes place on a coating line that has multiple coating stations with driers positioned in sequence. Prior to applying the first adhesive polyurethane coating layer, the fabric substrate is heat-set and stabilized by passing it through an oven at an elevated temperature of from about 250° F. to about 400° F. Thereafter, the fabric substrate is coated in accordance with the present invention. The multi-layered woven textile substrate is coated in accordance with the method disclosed in the above-identified copending applications of which this application is a continuation-in-part.

According to one aspect of the present invention, as can be seen by reference to FIGS. 1–5, a textile fabric substrate 10 is coated in the manner disclosed in the aforementioned applications Ser. Nos. 09/327,243, now U.S. Pat. No. 6,239,046, and Ser. No. 09/327,244, now abandoned in favor of continuation application Ser. No. 09/956,639, filed Sep. 19, 2001, respectively. In FIG. 1, the fabric is first coated on its upper or top surface 12 with an adhesive polyurethane layer 14, referred to as a prime coat or adhesive coat, which serves to adhesively bond the filaments of the textile substrate so they do not comb or unravel. The adhesive polyurethane used in the prime coat or first layer 14 can be selected from among aromatic or aliphatic polyether or polyester polyurethanes and, preferably those having a solids content of from about 30% to about 60%, by weight. The polyurethane coating weight applied is about 0.3 ounces/square yard to about 1.5 ounces/square yard with about 0.5 ounces/square yard being preferred. These types of polyurethanes provide good adhesion to nylon and satisfactory hydrolysis, i.e., resistance to breakdown under ambient storage conditions, to insure that the air bag or air curtain will be ready for use when deployed.

Preferably, the prime coat layer 14 in FIG. 1 completely covers the entire outer surface 12 of the fabric 10. Alternatively, it can be applied as a partial coating which coincides with a particular predetermined area of the fabric. Particular patterns, such as stripes, wavy lines, etc., with different coating weights also can be employed to obtain the level of air permeability desired. The adhesive or prime coating layer is then dried in an oven at a temperature in the range of from about 225° F. to about 450° F. for about 1.5 minutes to about 3.0 minutes while advancing the fabric at a speed of about 1,000 yards per hour to about 3,000 yards per hour. During this process, a speed of about 1,200 yards per hour is preferred. The prime coat polyurethane layer and the nylon fabric filaments crosslink with each other during this process to form a polymer chain.

Referring again to FIG. 1, at a second coating station, a second layer 16 of polyurethane, also referred to as the elastomeric layer, is deposited and coated onto the first layer 14. The elastomeric polyurethane layer 16 is an aromatic or aliphatic polyether or polyester polyurethane having a solids content of from about 30% to about 100% solids, by weight. Optionally, depending upon the chemical and physical properties sought to be introduced into the air bag, there is added to the elastomer, for example, flameproofing agents, such as aluminum trihydrate or antimony trioxide, mildew prevention agents, such as BP5® by Morton Thiokol and UV and ozone resistance agents, e.g., Tinuvin 765® by Ciba Geigy. The elastomeric layer 16 reacts with and chain extends with the prime coat layer 14 to establish a homogeneous composite. The coating weight is within the range of about 1 ounce/square yard to about 8 ounces/square yard, with about 2 ounces/sq. yard being preferred. It is then dried in an oven which is maintained at an elevated temperature from about 350° F. to about 450° F.

Thereafter, if desired, a third layer or topcoat 18 of an aliphatic or aromatic polyether or polyester polyurethane is coated onto the second polyurethane layer 16 as is shown in FIGS. 1 and 2, and as is disclosed in copending parent U.S. patent application Ser. No. 09/327,244, now abandoned in favor of continuation application Ser. No. 09/956,639, filed Sep. 19, 2001. As noted, in this application the top coat layer 18 is intended to prevent blocking or self-sticking of the air bag layers to each other when the bag is in its collapsed, folded condition, and during deployment. As noted further, the preferred coating weight is from about 0.2 to about 2.0 ounces per square yard with a coating weight of about 0.5 ounces/sq. yard preferred. This coating layer is heated at an elevated temperature of from about 250° F. to about 400° F. for 1.5 to 3.0 minutes in an oven, during which it crosslinks with the second coating layer.

As disclosed in copending parent application Ser. No. 09/327,243, now U.S. Pat. No. 6,239,046 and 09/327,244, now abandoned in favor of continuation application Ser. No. 09/956,639, filed Sep. 19, 2001, the laminated or composite structure depicted in the figs. typically forms a panel of an air bag or an air curtain after die cutting into the desired configuration by the air bag manufacturer. A complementary composite structure, similar in all respects to the composite structures shown in the figs. forms the opposite panel of the air bag or air curtain. In accordance with the present invention, the two (2) panels are then sealed together about their respective peripheries by sealing the polyurethane layers together, by radio frequency (RF) sealing, hot air sealing or ultrasonic sealing at from about 10 to about 80 megahertz and at a temperature of from about 250° F. to about 450° F., with RF sealing being preferred. Sealing in this manner serves to better control the air permeability of the bag while maintaining its integrity against air leakage, since conventional closing by stitching or sewing with its attendant inherent leakage problems are avoided. Employing a polyurethane-radio frequency sealing system is especially important in the manufacture of air-filled tubular curtains since the air or inflating gas must be held in the tubular structures which form the curtain for longer periods of time than with a conventional air bag. Such curtains must open within 2 to 3 milliseconds after a collision and must stay inflated for about 3 to about 12 seconds after deployment in the event of multiple rollovers, say, three (3) such rollovers in a single incident.

An alternative laminated or composite structure is shown in FIG. 2. In this arrangement, the upper or outer surface 12 of fabric 10 is coated with the same coating layers as shown in FIG. 1. However, in this embodiment, the bottom or inner surface 20 of fabric substrate 10 is coated with a layer of polysiloxane 22. The coated fabric is then dried in an oven at a temperature of from about 275° F. to about 450° F. so as to permit the layers to become vulcanized with the textile substrate. The polysiloxane layer 18 is preferably a silicone rubber elastomer. The coating weight of the polysiloxane layer 22 on the inner surface 20 is from about 0.5 ounces per square yard to about 5.0 ounces per square yard, with 1.2 ounces per square yard preferred. The silicone coating provides added protection to the fabric to protect against the high temperatures encountered during inflation with hot gases.

In another embodiment, as can be seen by reference to FIG. 3, a fabric substrate 110 is first coated on its upper or top surface 112 with a prime coat of an adhesive polyurethane layer 114, which serves to adhesively bond the filaments of the textile substrate so they do not comb or unravel. The polyurethane used in the prime coat or first layer 114 can be selected from among aliphatic and aromatic polyether and polyester polyurethanes, preferably those having a solids content of from about 30% to about 60%, by weight. These types of polyurethanes provide good adhesion to nylon and polyester and have satisfactory hydrolysis, i.e., resistance to breakdown under ambient storage conditions, to insure that the air bag, side curtain or the like will be ready for use when deployed.

As is also noted in the aforementioned copending parent applications, preferably the prime coat layer 114 completely covers the entire surface 112 of the fabric 110, or it can be a partial coating dimensioned to coincide with a particular area of the fabric. Particular patterns, such as stripes, wavy lines, etc., with different coating weights, also can be employed to obtain the level of air permeability desired. The prime coat layer is then dried in an oven at an elevated temperature of from about 225° F. to about 425° F. for about 1.5 minutes to about 3.0 minutes while advancing the fabric at about 1,000 yds/hr. to about 3,000 yds./hr., with 1,200 yds/hr. being preferred.

Figure 4:
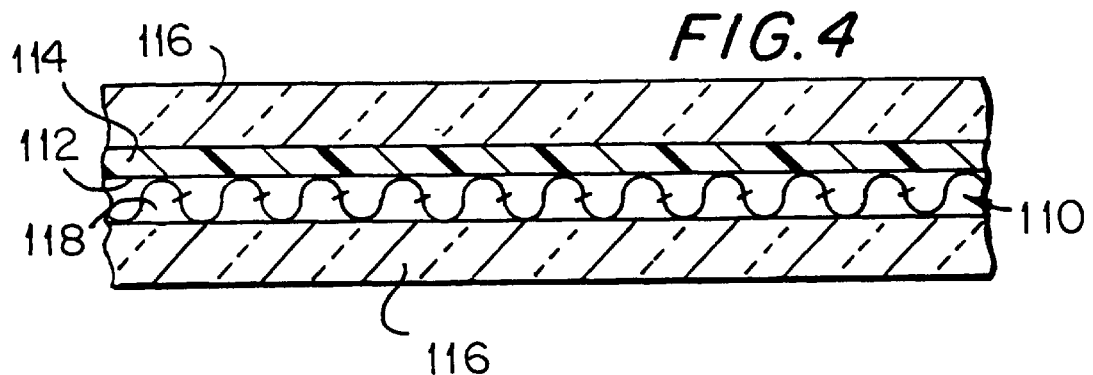
FIG. 4 is a cross-sectional view of a single layer textile substrate coated on one surface as illustrated in FIG. 3 and having a polysiloxane coating on the reverse surface.
Figure 5:
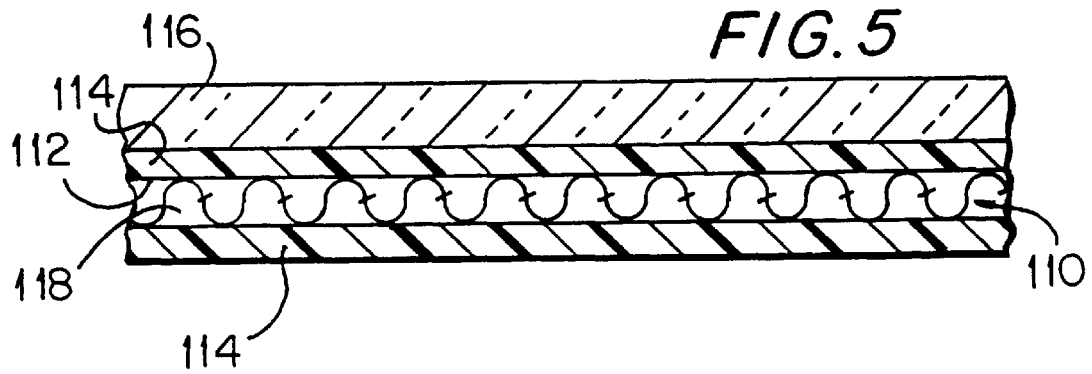
FIG. 5 is a cross-sectional view of a single layer textile substrate coated on one surface as illustrated in FIG. 3 and coated on the opposite surface with polyurethane.

Alternatively, at a second coating station, an elastomeric polysiloxane—which is preferably a silicone rubber elastomer layer 116—is then coated onto the surface of the polyurethane layer 114 in overlying relationship thereto as shown in FIGS. 3–5. The coating weight of the elastomeric polysiloxane layer is about 0.5 ounces/sq. yd. to about 5.0 ounces/sq. yard, with about 1.2 ounces/sq. yard being preferred. It is then dried in an oven at an elevated temperature of from about 300° F. to 450° F.

Since the silicone layer is inert, it yields a non-blocking i.e., (non-sticking) product that does not stick to itself during extended storage in the vehicle, and will deploy instantaneously when needed in the event of an accident. As an additional advantage, silicone is extremely resistant to the elevated temperature encountered during inflation.

The laminated or composite structures shown in the figures typically form a panel of an air bag or air curtain after die cutting into the desired configuration by the air bag manufacturer. A complementary composite structure, similar in all respects to the structures shown in the drawings, forms the opposite panel of the air bag or side air curtain. As is noted in the parent applications, a pair of such coated panels are joined together about their peripheries by sewing alone, or by sewing and heat sealing, or by sewing and room temperature vulcanization. When heat sealing is employed, radio frequency (RF) sealing, hot air sealing or ultrasonic sealing at about 10 to about 80 megahertz at a temperature of from about 250° F. to about 450° F. are the preferred sealing methods, with RF sealing being especially preferred.

In still another embodiment as disclosed in parent application Ser. No. 09/327,243, now U.S. Pat. No. 6,239,046, there is illustrated in FIG. 4 the same composite structure as shown in FIG. 3 on the upper surface 112 of substrate 110, while the bottom or inner surface 118 is coated with a polysiloxane-or silicone-layer 116, which is similar in its chemical and physical properties to the silicone layer 116 shown in FIG. 3. This silicone layer provides added heat resistance to the interior of the air bag to protect it against the hot gases generated during inflation.

In still another alternative embodiment as is disclosed in parent application Ser. No. 09/327,243, now U.S. Pat. No. 6,239,046, there is shown in FIG. 5 the same laminated structure as in FIG. 3 on the upper surface 112 of substrate 110, while the inner surface 118 is coated with a polyurethane layer 114, which is similar in its composition and chemical and physical properties to the prime coat polyurethane layer 114 of FIG. 3. Having a polyurethane coating layer, or if desired, a plurality of polyurethane coating layers, on the inner surface of the substrate, serves to enhance the air holding capability of the air bag and affords better control of the air volume and air pressure.

One embodiment of the present invention involves coating multi-layered woven textile substrates, such as those formed on Jacquard machines or Dobby looms. Further, such multi-layered textile fabrics are preferably woven of nylon filamentary materials and are made to have preconfigured air-holding pockets defining internal cavities without the need to join separate panels of fabric together by sewing, heat sealing, RF welding, etc., as discussed hereinabove. Alternative materials such as other polyamides, polyethers or other known air bag materials are contemplated. The woven air-holding pockets can be, for example, in the shape of tubular channels, or other geometric shapes, such as square, circular or oval in design. One such shape is shown in FIG. 6, which is a perspective view from above of a continuous web of uncoated multi-layered fabric 220 having a plurality of air-holding pockets 222 separated by woven connectors 221 moving in direction "A" through a coating process of the type described hereinabove. FIG. 6, is a top view of a continuous web of such fabric which has multiple pockets 222 that are comprised of separate fabric layers 226, 228 that form air-holding cavities 230 as shown for example in FIG. 7. For illustration purposes, pockets 222 are shown in the inflated condition which occurs when the air bag is deployed by introduction of an inflating gas into the pockets 222.

Referring again FIGS. 6–7, multi-layered fabric 220 is comprised of a plurality of fabric pockets 222 separated from each other by multi-layered fabric connectors 221 which are machine formed in continuous fashion with the pockets 222. Fabric connectors 221 are each comprised of relatively narrow width, or "minor" sections of fabric 232 and 234 immediately adjacent each pocket 222, respectively, which are connected to each other by dual layered fabric sections 224 which are formed continuously on a Jacquard machine or Dobby loom as separate layers of fabric 224a, 224b as shown in FIG. 7. Minor sections 232 and 234 are each formed as a single fabric of dual thickness whereby the filaments are interwoven in interlocking relation. The minor sections 232 and 234 of dual thickness fabric provide substantial supportive strength to the pockets 222 upon inflation, since they are immediately adjacent the pockets 222 and thereby define the outermost dimensions of the pockets 222. The dual layered fabric connectors 224 are stitched together by stitches 225 shown schematically in FIGS. 6 and 7, and are intended as connective devices which connect the pockets 222 to each other. As noted, although the pockets 222 are shown in FIG. 6 to be generally rectangular in plan view, any shape or combination of shapes is contemplated, such as tubular, circular, wavy, etc. Further, although not shown in FIGS. 6–7, appropriate channels are provided to hold gas conduits or the like to direct the inflating gas into all of the pockets 222 to inflate the side air curtain.

Referring now to FIGS. 8–9, there is shown the continuous multi-layered web 220 of FIG. 6, after completion of a coating process as described hereinabove in connection with any of FIGS. 1–5. The web 220 of FIGS. 6–7 is shown as coated web 320 in FIG. 8 so as to distinguish the coated multi-layered fabric from the uncoated fabric 220 of FIGS. 6–7. As can be seen in FIGS. 8–9, the coated multi-layered fabric web 320 is comprised of the fabric web 220 of FIGS. 6–7, having one or more layers of coating material 340 thereon as disclosed in FIGS. 1–5. For convenience of illustration, the cross-sectional view of FIG. 9 illustrates a coating layer 340 as a single layer of coating material however, layer 340 is intended to depict any of the combination of layers of coating material as described in connection with FIGS. 1–5, and as described in parent application Ser. Nos. 09/327,243, now U.S. Pat. No. 6,239,046, and 09/327,244, now abandoned in favor of continuation application Ser. No. 09/956,639, filed Sep. 19, 2001, or alternative combinations thereof. Furthermore, coating material 340 is shown in FIG. 9 on one side only of fabric 220 for illustration purposes. However, both sides of the fabric web 220 may be coated as described, for example, in connection with FIGS. 2, 4, and 5.

Referring again to FIGS. 8–9, the multi-layered fabric 220 of FIGS. 6–7 includes multiple pockets 222 which define air holding pockets 230 as described in connection with FIGS. 6–7. The pockets 222 in FIGS. 8–9 are formed of separate fabric layers 226 228 as described in connection with FIGS. 6–7, and are coated or layered by one or more coating layers as described in connection with FIGS. 1–5, and as illustrated at 340 in FIG. 9 to form the coated multi-layered textile fabric web according to the invention.

Referring again to FIG. 6, the continuous web 220 of air-holding tubular pockets 222 is made to move in direction "A" through a coating process of the type described hereinabove. The tubular pockets 222 are shown separated by fabric connectors 221 as described above. The fabric connectors 221 are each formed of three separate sections, two minor sections 232 and 234 which are immediate adjacent to pockets 222, and which are of dual thickness and are formed of interlocked threads, and a central major-section 224 formed of opposed separate fabric layers 224a and 224b. The minor sections 232, 234 and the layers 224a, 224b are formed continuously on the loom; however, the minor sections 232 and 234 are provided to add strength to the pockets 222, since they define the immediate margins thereof, and the layers 224a and 224b, which are machine produced at a relatively rapid rate, are merely stitched together on the forming machine and simply act as connectors for the pockets 222. The relative widthwise dimensions of minor sections 232 and 234 and the separate layers 224a and 224b will depend upon the individual design in each case, and will therefore vary in dependence upon the particular vehicle restraint device. Suffice it to state that layers 224a and 224b are utilized where dual thickness strength is not required, since these layers are produced at a significantly faster rate than the rate of production of minor sections 232 and 234.

Referring now to FIG. 9 there is shown a cross-sectional view of the coated fabric of FIG. 8 taken along lines 9—9. The continuous fabric web 220 has multiple air-holding pockets 222 that are comprised of separate fabric layers 226 and 228, that form air-holding cavities 230 separated by fabric connectors 221 as described hereinabove. In the multi-layered woven fabric shown in FIGS. 6–7 and the coated embodiment of FIGS. 8–9, as well as others of different configurations, the air-holding pockets, tubular channels, etc. must be completely sealed around all woven areas and, in particular, around the areas of separation or segmentation that form the individual air-holding cavities. Further, these multi-layered woven fabrics must be coated as described above, particularly with reference to FIGS. 1–5.

As noted, when the multi-layered woven fabric substrate of the present invention is coated in a process of the types described herein, it will have the same type of coating layers thereon as shown in the examples given in FIGS. 1–5. Preferably, it will have coatings on both the top and bottom surfaces of the fabric substrate as shown in FIGS. 2, 4 and 5. Thus, the fabric substrate could have a polyurethane coating, such as that shown in FIG. 1, on one side, and a polysiloxane coating, such as that shown in FIG. 3, on the other side. Alternatively, the fabric substrate could also have a polyurethane coating on both sides. Similarly, the fabric substrate could have a polysiloxane coating on both sides. The woven fabric substrate may also have any other combination of polyurethane and/or polysiloxane coatings, on either side, as shown in the examples of any of FIGS. 1–5. For example, the first coating layer of adhesive polyurethane may be coated with a second coating layer of elastomeric polyurethane or polysiloxane. The elastomeric polyurethane and polysiloxane layers, however, may be coated only with like polymeric materials, e.g., polyurethane-polyurethane and polysiloxane-polysiloxane. As noted, polysiloxane ordinarily will not adhere to a layer of polyurethane, nor will polyurethane adhere to a layer of polysiloxane. However, either of these polymeric materials will adhere to the adhesive polyurethane layer as disclosed.

These coated multi-layered textile fabrics with preconfigured air-holding cavities will have the same superior air-holding and other properties as the fabric substrates referred to in the co-pending parent applications of which this application is a continuation-in-part. The woven textile fabrics of the invention are coated and prepared as "roll goods", i.e. they are manufactured as a continuous roll of coated fabric. The fabrics are later cut into predetermined lengths, sewn, heat sealed or RF welded, or combinations thereof, into the appropriate size and shape desired for installation into a particular automotive vehicle. These shapes may also include sealed dead air zones in which no inflation will occur, such as where seat backs or other automotive structures require no impact protection. After the safety device is prefabricated and adapted for installation in a particular vehicle, it is fitted with inflation tubes (not shown) through which it will receive the inflation gas that is generated by the inflator when the device is deployed. The inflation tube is typically sewn or clamped into the device at either or both of its ends, depending upon the size of the side air curtain. The inflation tubes will deliver the inflation gas to the individual air-holding pockets or tubular air-holding channels shown in the examples of the figures herein, to produce a fully operational automotive vehicle safe restraint device.

What is claimed is:

1. A coated textile substrate for an air-holding vehicle restraint system which comprises:
   a) a multi-layered textile substrate having opposed outer surfaces;
   b) a first coating layer of an adhesive polyurethane on a first surface of said multi-layered textile substrate; and
   c) at least a second coating layer of an elastomeric polysiloxane on said first coating layer.

2. A coated textile fabric for an air-holding vehicle restraint system, which comprises:
   a) a multi-layered textile substrate having first and second opposed outer surfaces and preconfigured air-holding cavities therein;
   b) at least a first coating layer of adhesive polyurethane coated on both said first and second opposed outer surfaces of said textile substrate; and
   c) at least a second coating layer of a polymeric material coated on both of said first coating layers of adhesive polyurethane.

3. The coated textile fabric of claim 2 wherein said multi-layered textile substrate is a fabric constructed from synthetic material.

4. The coated textile fabric of claim 3 wherein said synthetic material is selected from the group consisting of polyamides and polyesters.

5. The coated textile fabric of claim 4 wherein said coated textile substrate is a woven nylon fabric.

6. The coated textile fabric of claim 4 wherein said first coating layer is selected from the group consisting of aromatic or aliphatic polyester polyurethanes and aromatic or aliphatic polyether polyurethanes.

7. The coated textile fabric of claim 2 wherein both said second coating layers are each coated with a third coating layer of elastomeric polyurethane or polysiloxane.

8. The coated textile fabric of claim 2 wherein one of said second coating layers is elastomeric polyurethane and said other of said second coating layers is polysiloxane.

9. A coated textile fabric for an air-holding vehicle restraint system, which comprises:
   a) a multi-layered woven fabric substrate having first and second opposed outer surfaces and preconfigured air-holding woven cavities defined between said fabric layers;
   b) at least a first coating layer of adhesive polyurethane coated on both said first and second outer surfaces of said textile substrate;
   c) at least a second coating layer of elastomeric polyurethane or polysiloxane coated on said first coating layers of adhesive polyurethane; and
   d) at least a third coating layer of a polymeric material coated on at least one of said second coating layer.

10. The coated textile fabric of claim 9 wherein said woven textile substrate is a fabric constructed from synthetic material.

11. The coated textile fabric of claim 10 wherein said synthetic material is comprised of synthetic filamentary material selected from the group consisting of polyamides and polyesters.

12. The coated textile fabric of claim 9 wherein said woven textile substrate is comprised of woven nylon filaments.

13. The coated textile fabric of claim 9 wherein said first coating layers are selected from the group consisting of aromatic or aliphatic polyester polyurethanes and aromatic or aliphatic polyether polyurethanes.

14. The coated textile fabric of claim 9 wherein both said first coating layers are coated with a second coating layer of elastomeric polyurethane.

15. The coated textile fabric of claim 9 wherein one of said first coating layers is coated with a second coating layer of elastomeric polyurethane and one of said other first coating layers is coated with a second coating layer of polysiloxane.

16. The coated textile fabric of claim 14 wherein at least one of said second coating layers of elastomeric polyurethane is coated with a third coating layer of elastomeric polyurethane.

17. The coated textile fabric of claim 15 wherein at least one of said second coating layers of polysiloxane is coated with a third coating layer of polysiloxane.

18. The coated textile fabric of claim 15 wherein said second coating layer of elastomeric polyurethane is coated with a coating layer of elastomeric polyurethane.

19. The coated textile fabric of claim 15 wherein said second coating layer of polysiloxane is coated with a third coating layer of polysiloxane.

20. The coated textile fabric of claim 15 wherein said second coating layer of polyurethane is coated with a third coating layer of elastomeric polyurethane and said second coating layer of polysiloxane is coated with a third coating layer of polysiloxane.

21. The coated textile fabric of claim 9 wherein said first coating layers of adhesive polyurethane each have a coating weight of from about 0.3 ounces/sq. yd to about 1.5 ounces/sq. yd.

22. The coated textile fabric of claim 21 wherein said coating weight is about 0.5 ounces/sq. yd.

23. The coated textile fabric of claim 9 wherein said second coating layer is an elastomeric polymer selected from the group consisting of aromatic or aliphatic polyether polyurethanes and aromatic or aliphatic polyester polyurethanes having a solids content of from about 30% to about 100% by weight.

24. The coated textile fabric of claim 23 wherein said second coating layer has a coating weight of about 1 ounce/sq. yd. to about 8 ounces/sq. yd.

25. The coated textile fabric of claim 24 wherein said second coating layer has a coating weight of about 2 ounces/sq. yd.

26. The coated textile fabric of claim 9 wherein said third coating layer is an elastomeric polymer selected from the group consisting of aromatic or aliphatic polyether polyurethanes and aromatic or aliphatic polyester polyurethanes having a coating weight of from about 0.2 ounces/sq. yd. to about 2.0 ounces/sq. yd.

27. A coated textile fabric for an air-holding vehicle restraint system, which comprises:

a) a woven fabric nylon having first and second opposed outer surfaces, at least one portion thereof defined by at least two fabric layers positioned in face-to-face relation and unconnected to define at least one pre-configured air holding cavity, each said cavity having adjacent thereto, a fabric portion wherein said fabric layers are connected to each other;

b) at least a first coating layer of adhesive polyurethane coated on both said first and second opposed outer surfaces of said textile substrate; and c) at least a second coating layer of a polymeric material coated on both of said first coating layers of adhesive polyurethane.

* * * * *